MAGNETIC APPARATUS FOR SAMPLING DISCRETE LEVELS OF DATA

Filed July 29, 1964 5 Sheets-Sheet 1

INVENTORS
LANNY L. HARKLAU
RAYMOND H. JAMES
BY Thomas J. Nikolai
ATTORNEY

INVENTORS
LANNY L. HARKLAU
RAYMOND H. JAMES
BY Thomas J. Nikolai
ATTORNEY

MAGNETIC APPARATUS FOR SAMPLING DISCRETE LEVELS OF DATA

Filed July 29, 1964

INVENTORS
LANNY L. HARKLAU
RAYMOND H. JAMES
BY Thomas J. Nikolai
ATTORNEY

MAGNETIC APPARATUS FOR SAMPLING DISCRETE LEVELS OF DATA

Filed July 29, 1964

INVENTORS
LANNY L. HARKLAU
RAYMOND H. JAMES

BY Thomas J. Nikolai
ATTORNEY

MAGNETIC APPARATUS FOR SAMPLING DISCRETE LEVELS OF DATA

INVENTORS
LANNY L. HARKLAU
RAYMOND H. JAMES
BY Thomas J. Nikolai
ATTORNEY 3,392,377
Patented July 9, 1968

3,392,377

MAGNETIC APPARATUS FOR SAMPLING DISCRETE LEVELS OF DATA

Lanny L. Harklau, Minneapolis, and Raymond H. James, Bloomington, Minn., assignors to Sperry Rand Corporation, New York, N.Y., a corporation of Delaware Filed July 29, 1964, Ser. No. 385,994
8 Claims. (Cl. 340—174)

ABSTRACT OF THE DISCLOSURE

A memory device that stores discrete levels of data as a function of the degree of the partial switching of the device's magnetizable element's magnetic flux. The memory device includes at least two magnetizable memory elements in which the signal that defines the information that is to be sampled is coupled only to a first element but which information is subsequently read out of a separate second element. Information storage in the separate second element is accomplished by the variation of the back EMF that is generated by the information signal, which back EMF is induced in a line coupling both cores thus causing an appropriate effect upon the magnetic state of the second element.

The value of the utilization of small cores of magnetizable material as logical memory elements in electronic data processing systems is well known. This value is based upon the bistable characteristic of magnetizable cores which include the ability to retain or remember magnetic conditions which may be utilized to indicate a binary "1" or a binary "0." As the use of magnetizable cores in electronic data processing equipment increases, a primary means of improving the computational speed of these machines is to utilize memory elements that possess the property of nondestructive readout, for by retaining the initial state of remanent magnetization after readout the rewrite cycle required with destructive readout devices is eliminated. As used herein, the term "nondestructive readout" shall refer to the sensing of the relative directional-state of the remanent magnetization of a magnetizable core without destroying or reversing such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein; however, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristic is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction thereby driving the core to saturation in the opposite direction of polarity, i.e., of positive to negative saturation. When the core switches the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the threshold characteristic of a core having a substantially rectangular hysteresis characteristic. In this technique, a minimum of two interrogate lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient amplitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture, with a transverse interrogate field, i.e., an externally applied field directed across the core's internal flux, applied by a second low remanent-magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article "The Transfluxor," Rajchman and Lo, Proceedings of the IRE, March 1956, pp. 321–332. This method utilizes a "transfluxor" which comprises a core of magnetizable material of a substantially rectangular hysteresis characteristic having at least a first large aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on read-out of the stored data. Also, where the final core flux density level is limited solely by the amplitude of the applied drive field it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is less than the flux density of the second stable state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, Supplement, vol. 32, No. 3, pp. 38S–39S, March 1961, provides excellent background material for the switching technique utilized in the present invention.

The magnetic conditions and their definitions as discussed above may now be itemized as follows:

*Partial switching*

Amplitude-limited-condition wherein with a constant drive field amplitude, increase of the drive field duration will cause no appreciable increase in core flux density.

Time-limited-condition wherein with a constant drive field amplitude, increase of the drive field duration will cause appreciable increase in core flux density.

*Complete switching*

Saturated-condition wherein increase of the drive field amplitude and duration will cause no appreciable increase in core flux density. Stable-State-condition of the magnetic state of the core when the core is not subjected to a variable magnetic field or to a variable current flowing therethrough.

The term "flux density" when used herein shall refer to the net external magnetic effect of a given internal magnetic state; e.g., the flux density of demagnetized state shall be considered to be a zero or minimum flux density while that of a saturated state shall be considered to be a maximum flux density of a positive or negative magnetic sense.

The preferred embodiment of the present invention is concerned with the establishment of a predeterminably variable magnetic flux level in a magnetizable memory device which flux level is representative of the amplitude of an incremental portion of a transient electrical signal. In the preferred embodiment an incremental portion of a transient signal from a first constant current source is gated into the magnetic device by a strobe pulse from a second constant current source. The maximum amplitude of the transient signal is limited to a level well below the switching threshold of the magnetic device such that the transient signal alone is incapable of affecting the flux level of the magnetic device. The strobe pulse is of an amplitude sufficient to switch the flux state of the magnetic device from a first saturated state to a second and opposite saturated state but is of such a limited duration so as to preclude such complete flux reversal. However, such duration is sufficient to set the flux level in an intermediate time-limited flux state. Different incremental portions of the transient signal may be gated into the magnetic device by delaying the transient signal different time increments with respect to the strobe pulse; each different time delayed increment of the transient signal may be gated by a strobe pulse into a separate magnetic device so that each separate magnetic device stores a flux level representative of the net magnetomotive force effect of the strobe pulse and that portion of the transient signal gated by the strobe pulse.

In the preferred embodiment of this invention the memory device is comprised of two toroidal ferrite cores termed the information core and the signal core. The strobe pulse is serially coupled to both the information core and the signal core and is of a sufficient time-limited amplitude-duration characteristic to set the flux levels of both cores into a substantially demagnetized state, i.e., a 50% flux state, from an initial substantially saturated state. The transient signal is, in contrast, coupled only to the signal core. The coupling of the transient signal to the memory device induces a back EMF in the strobe pulse line, such line being coupled to the information core and the signal core. The transient signal induced back EMF is coincident with the coupling of the strobe pulse to the memory elements and reduces the magnetomotive force effectiveness of the strobe pulse as the strobe pulse source is effectively coupled to a higher impedance load. As the strobe pulse is coupled to both the information core and the signal core this reduced strobe pulse effectiveness causes a corresponding reduced flux change in the information core; that is, the transient signal induced EMF in the strobe pulse line reduces the effectiveness of the strobe pulse below that level that would be achieved by the strobe pulse alone. Readout of that portion of the transient signal sampled by the relatively short duration strobe pulse is accomplished by coupling a saturating read signal to the information core which sets the magnetic state of the information core back into its initial saturated state with the resulting flux change inducing in a sense line coupled only to the information core a readout signal representative of the amplitude of the sampled portion of the transient signal. Thus, the present invention provides a memory device in which information is written into a first signal core but read out of a second information core not an integral part of said first signal core.

It is a further object of the present invention to provide a device including first and second separate magnetizable memory elements whereby information is coupled to and stored in a first element but read out of a second element. Such information is stored as a function of the variation of the back EMF that is generated by the information signal which back EMF is induced in a line coupling both cores.

It is a further object of the present invention to provide a device and a method for the flux gating of an incremental portion of a constant current source transient electrical signal by a constant current source time-limited strobe pulse.

It is a further object of the present invention to provide a device and a method whereby an analog signal is sampled by a strobe pulse wherein the duration of the sampled portion of the analog signal is determined by the duration of the strobe pulse.

It is a further and more general object of the present invention to provide a novel method of operating a magnetic memory element as an analog signal sampling device.

These and other more detailed and specific objects will be disclosed in the course of the following specification, reference being had to the accompanying drawings, in which.

Figure 10A:
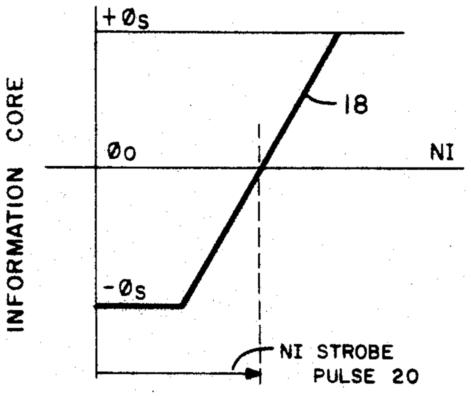
Figure 10B:
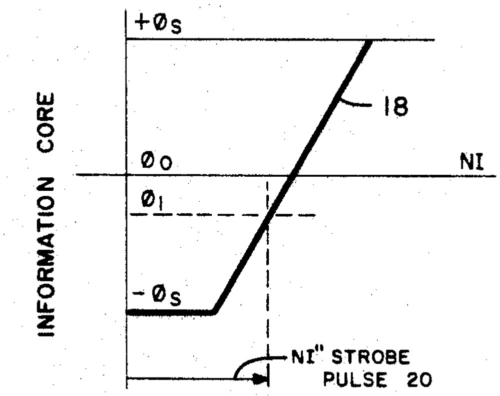
Figure 10C:
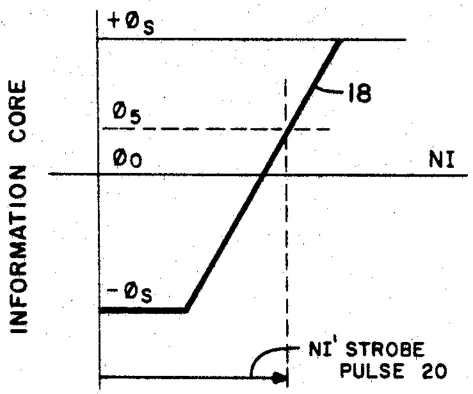

FIGS. 10*a*, 10*b* and 10*c* are illustrations of the flux changes in the information core due to the coupled drive fields.

Figure 11A:
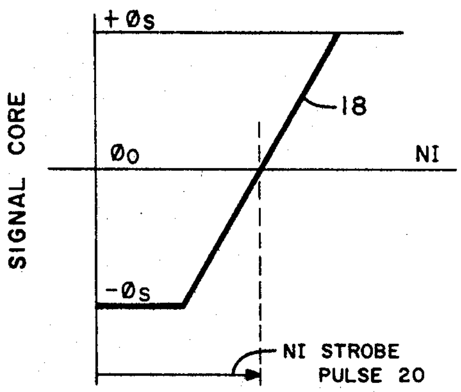
Figure 11B:
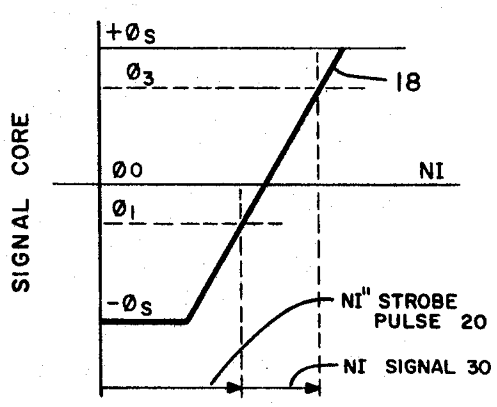
Figure 11C:
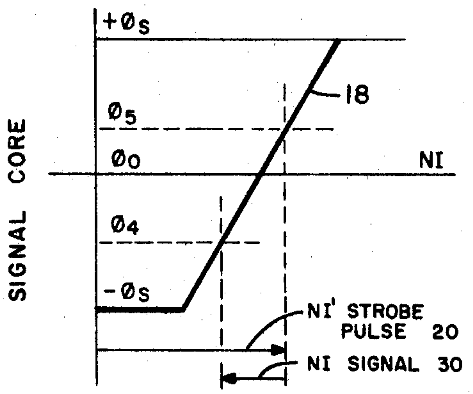

FIGS. 11*a*, 11*b* and 11*c* are illustrations of the flux changes in the signal core due to the coupled drive fields.

Figure 8:
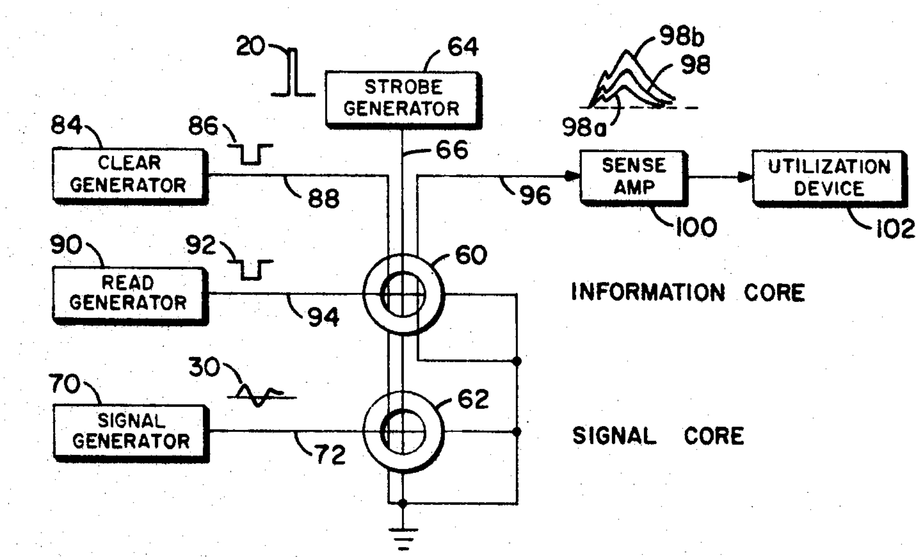
FIG. 8 is an illustration of a first embodiment of the present invention using toroidal ferrite cores as the information and signal cores.
Figure 12:
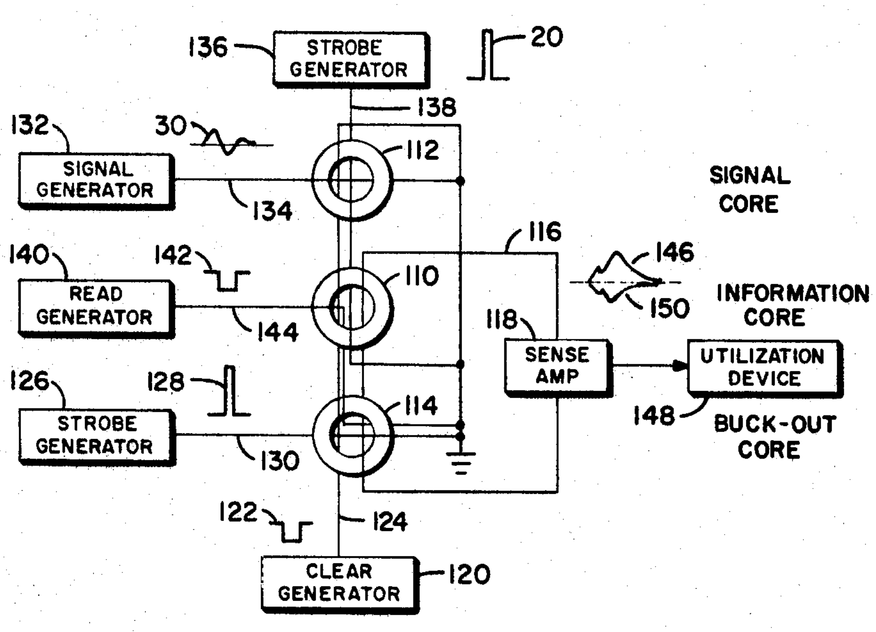

FIG. 12 is an illustration of a modification of the embodiment of FIG. 8 wherein there is incorporated a third toroidal ferrite core as a buck-out core.

Figure 13:
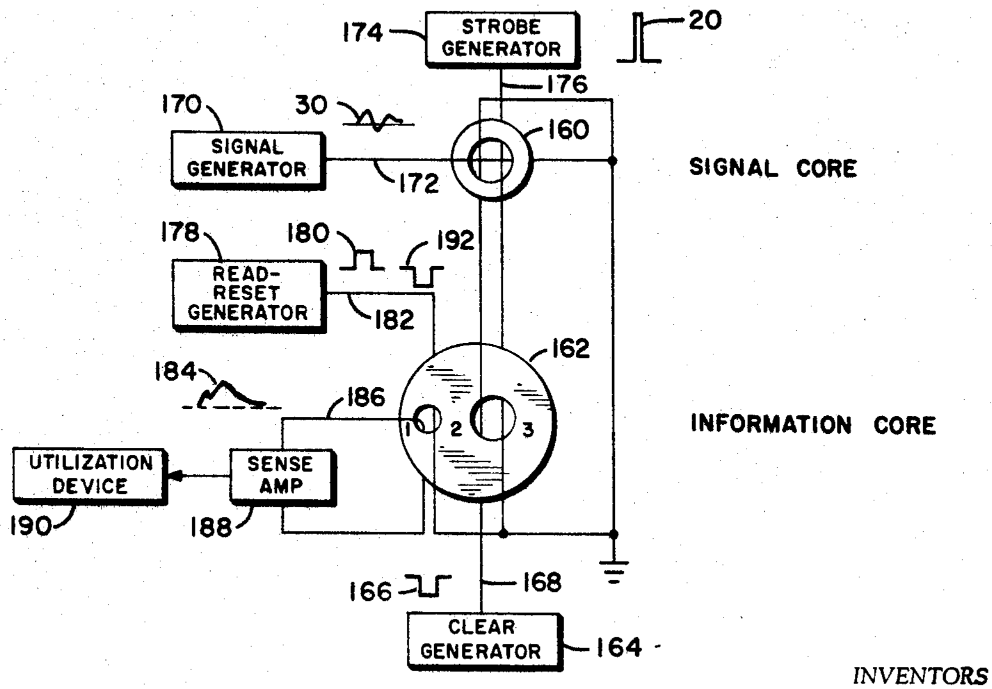

FIG. 13 is an illustration of a second embodiment of the present invention using a transfluxor as the information core.

To better understand a novel aspect of the present invention, a discussion of a constant current source driving signal as opposed to the use of a constant voltage source driving signal is presented.

Figure 1:
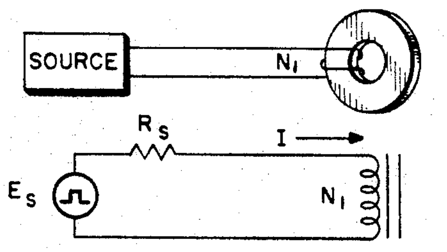
FIG. 1 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 1 illustrates the general circuit of a source driving a toroidal ferrite core with its equivalent circuit:

$E_S$=source voltage
$R_S$=source internal resistance
$N_1$=number of turns in the coil about the core
$I$=current flowing through the coil about the core This circuit may be defined mathematically by Equation 1

$$E_s=IR_s-N\frac{d\phi}{dt} \quad (1)$$

with it being assumed that the core is always initially in its negative saturated state and that the drive signal from the source drives the magnetic state of the core toward its positive saturated state. If $R_S$ is made small, Equation 1 reduces to Equation 2.

$$E_s\cong-N\frac{d\phi}{dt} \quad (2)$$

Therefore by making $R_S$ sufficiently small the conditions of a constant voltage source are fulfilled. Since $E_S$ and N are constants, $d\phi/dt$ is also a constant, and consequently the flux reversal is a linear function of time.

$$\int_{-\phi_s}^{-\phi_1}d\phi=\frac{E_s}{N_1}\int_0^t dt$$

$$\phi_s-\phi_1=\frac{E_st}{N_1} \quad (3)$$

For a complete flux reversal the integral, taken from $-\phi_S$ to $+\phi_S$, is (with $T_S$=time required for a complete flux reversal from $-\phi_S$ to $+\phi_S$)

$$\int_{-\phi_s}^{+\phi_s}d\phi=\frac{E_s}{N_1}\int_0^{T_s}dt$$

$$2\phi_s=\frac{E_sT_s}{N_1} \quad (4)$$

The voltage E induced in any coil about the core is (with $N_2$=the number of turns of a second coil on the core)

$$E=\frac{E_sN_2}{N_1}=\frac{2\phi_s}{T_s}N_2$$

Figure 3:
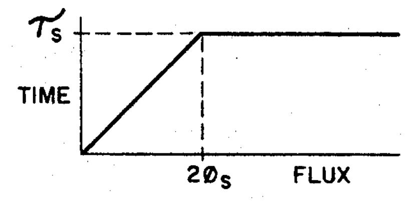
FIG. 3 is an illustration of the plot of flux versus time of the core of FIG. 1.
Figure 2:
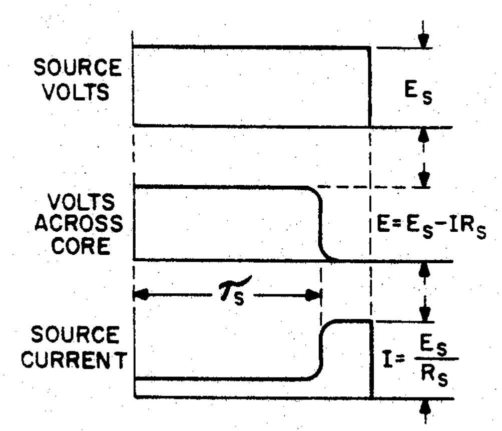
FIG. 2 is an illustration of the resulting voltages and currents of the circuit of FIG. 1 when driven by a constant voltage source.

The resulting voltages and currents under constant voltage source conditions are illustrated in FIG. 2, Equations 3 and 4 show that a plot of flux $\phi$ versus time would be as illustrated in FIG. 3. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_S$ as illustrated in FIG. 3 is due to the characteristics of the constant voltage source rather than those of the core.

If $R_S$ is made sufficiently large, Equation 1 reduces to Equation 5.

$$E_S\cong IR_S \quad (5)$$

Figure 4:
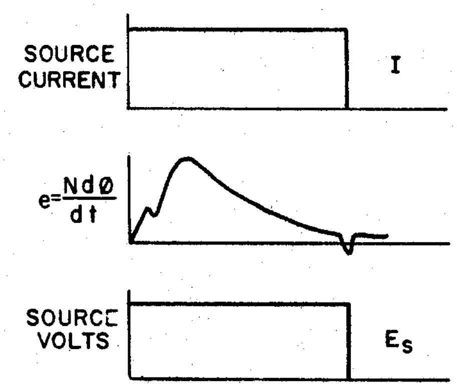
FIG. 4 is an illustration of the resulting voltages and currents of the circuit of FIG. 1 when driven by a constant current source.

Therefore, by making $R_S$ sufficiently large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 4. It is under these constant current source conditions that this present invention is concerned.

A phenomenological understanding of a time-limited flux state in a toroidal core, or the flux path about an aperture in a plate of magnetizable material such as a transfluxor, can be obtained by considering the flux distribution therethrough. The switching time $\tau_S$ or the time required for complete flux reversal from a first flux saturated state to a second and opposite flux state is given as follows:

$$\tau_s=\frac{Sw}{H-H_0}=\frac{Sw'}{NI-NI_0}$$

where:

$r$=radius of toroidal core
$\tau_s$=switching time
$I$=current in amperes
$Sw$=material constant
$N$=number of turns
$H$=applied field in $$\text{oe (oersteds)}=\frac{NI}{5r}$$

$H_0$=switching threshold in $$\text{oe}=\frac{NI_0}{5r}$$

$Sw'=Sw5r$

Since the applied field H is inversely proportional to the radius of the core, flux reversal takes place faster in an inside ring of the core than in an outside ring of the core.

Figure 5:
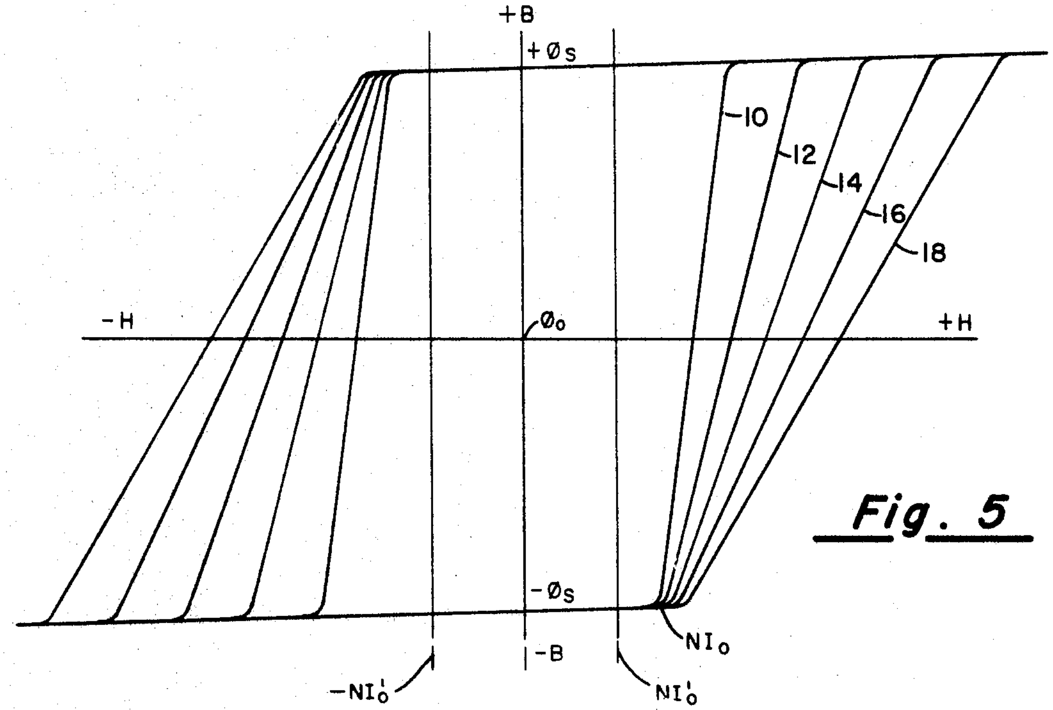
FIG. 5 is an illustration of the time dependent residual magnetization of the core of FIG. 1 utilizing the time-limited different-amplitude flux sampling strobe pulses of the present invention.

With particular reference to FIG. 5 there is illustrated a residual magnetization curve 10 of the magnetic elements utilized by the present invention. Curve 10 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 12–18 are residual magnetization curves and are plots of the irreversible flux $\phi$ versus the applied magnetomotive force NI wherein the drive current for each curve is of a constant duration and of increasing amplitude, i.e. the drive current producing curve 18 is of the shortest duration and the drive current producing curve 12 is of the longest duration. Each curve is obtained by using a drive current of a constant duration less than $\tau_s$ and successively increasing the drive current amplitude for each successive application of the drive current. The net irreversible flux $\phi$ for each applied drive current is plotted versus the applied magnetomotive force NI to provide the curve 12–18 for each particular drive current duration.

In the particular application of applicant's illustrated embodiment there is utilized a strobe pulse 20 (see FIG. 6) which is of a sufficient amplitude but of insufficient duration to switch the magnetic state of the coupled core from $-\phi_s$ to $+\phi_s$. This strobe pulse 20 is obtained from a constant current source and is limited in duration, e.g., time-limited so as to set the magnetic state of the core in the flux state $\phi_0$ of curve 18. Any variation in the amplitude of pulse 20 causes the magnetic state of the coupled core to be set into a different flux state between the limits of $+\phi_s$ and $-\phi_s$.

Figure 6:
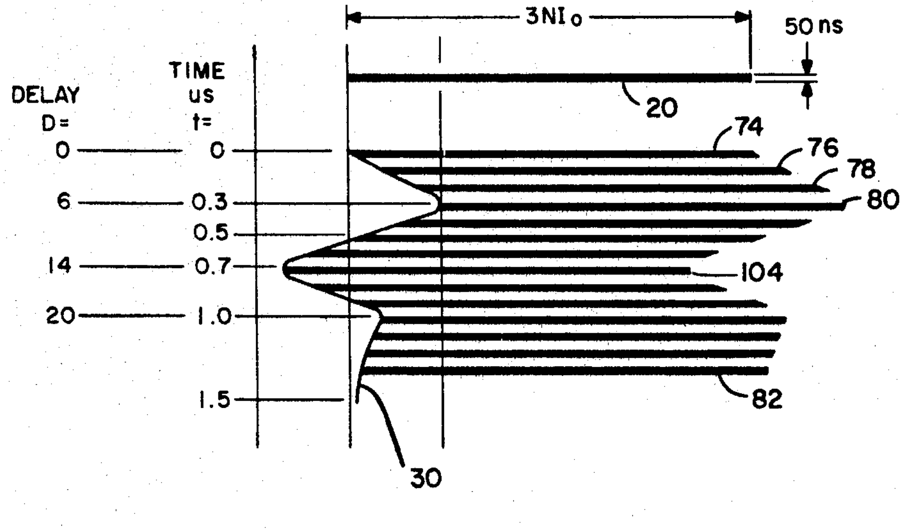
FIG. 6 is an illustration of a plot of a series of varying delayed strobe pulses upon a transient signal.

The present invention is concerned with a detector for and a method of sampling a transient current signal using the partial switching of a magnetic device. With particular reference to FIG. 6 there is illustrated a typical bipolar transient signal 30 which is to be sampled at any one or a plurality of times. Signal 30 is assumed to originate in a constant current source and is, in this embodiment, a bidirectional signal whose maximum NI as regards the coupled magnetic element, is less than $NI_0$, the switching threshold thereof.

Figure 7:
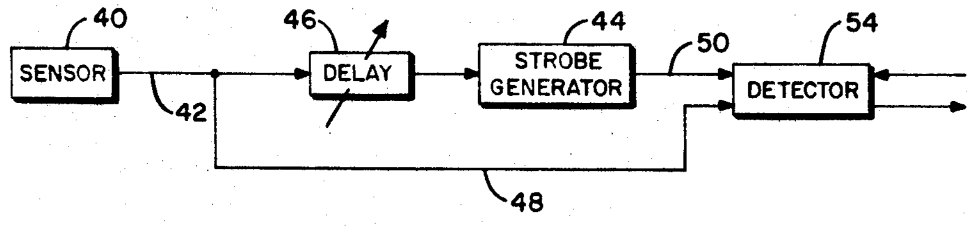
FIG. 7 is an illustration of a system capable of providing the series of delayed strobe pulses and transient signal relationships of FIG. 6.

With particular reference to FIG. 7, there is illustrated a diagram of a system whereby such sampling may be accomplished. Assume that the sensor 40 detects a transient phenomenon such as a nuclear weapon burst whose radiation intensity versus time characteristic is defined by signal 30. Signal 30 is coupled to line 42 which in turn couples signal 30 to serial arranged strobe generator 44 and variable delay 46, and to line 48. Delay 46 is a variable delay that may delay signal 30 an appropriate time such as D, 3D, 5D and 7D, respectively, and accordingly strobe generator 44, after such a delay would emit strobe pulse 20 which is coupled by way of conductor 50 to detector 54. Strobe pulse 20 acts as a constant current source flux gate gating into detector 54 that portion of signal 30 that is concurrent in time with pulse 20. Accordingly, if delay 46 is set at $D=0$, detector 54 would sample the wave front of signal 30 over the duration of strobe pulse 20. Further, if delay 46 were set at delays of 2D, 4D, 6D, etc., detector 54 would sample signal 30 at such delays, respectively, over the duration of strobe pulse 20. As the present invention utilizes strobe pulse 20 as a flux gate to the sampled portion of signal 30 the information stored in detector 54 is the net effect of the magnetomotive force of strobe pulse 20 and the magnetomotive force of that concurrent portion of signal 30 at the various delays determined by delay 46.

As the present invention utilizes the variation of the back EMF that is induced in a winding coupled to a magnetizable memory element operating in a varying flux state due to an applied drive current as a function of the applied drive current amplitude-duration characteristic, a discussion of the theory of such phenomenon is presented. With particular reference to FIG. 8, wherein information core 60 and signal core 62 have the magnetic characteristics of FIG. 5, the coupling of strobe pulse 20 to cores 60 and 62 from constant current source type strobe pulse generator 64 by way of line 66 induces in line 66 a back EMF opposing the affect of strobe pulse 20. The back voltage $E_{60}$ induced in line 66 due to the flux change in core 60 is $$E_{60}=-N_{60}\frac{d\phi_{60}}{dt}$$

where:

$N_{60}$=number of turns of line 66 on core 60
$d\phi_{60}/dt$=rate of change of flux $\phi$ in core 60 due to pulse 20.

The back voltage $E_{62}$ induced in line 66 due to core 62 is $$E_{62}=-N_{62}\frac{d\phi_{62}}{dt}$$

where:

$N_{62}$=number of turns of line 66 on core 62
$d\phi_{62}/dt$=rate of change of flux $\phi$ in core 62 due to pulse 20 and to the transient signal 30 sampled portion.

The total back voltage $E_B$ is the sum of the separate back voltages $E_{60}$ and $E_{62}$ $$E_B=E_{60}+E_{62}=-N_{60}\frac{d\phi_{60}}{dt}-N_{62}\frac{d\phi_{62}}{dt}$$

The current $I_B$ due to the total back voltage is the total back voltage $E_B$ divided by the total circuit impedance R, or $$I_B=\frac{E_B}{R}=\frac{-N_{60}\frac{d\phi_{60}}{dt}-N_{62}\frac{d\phi_{62}}{dt}}{R}$$

The true current $I_T$ is equal to the applied drive current $I_A$ less the back current $I_B$ or $$I_T=I_A-I_B$$

where the applied drive current $$I_A=\frac{E_A}{R}$$

where $E_A$ is the applied voltage from a constant current source. The true current $I_T$ is then defined by the equation $$I_T=\frac{E_A}{R}-\frac{\frac{N_{60}d\phi_{60}}{dt}+\frac{N_{62}d\phi_{62}}{dt}}{R}$$

Figure 9:
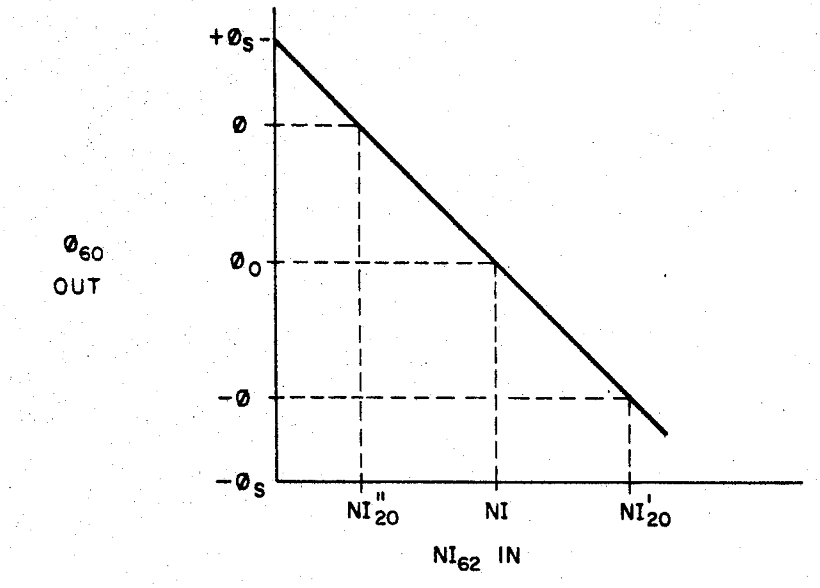
FIG. 9 is an illustration of the flux change in the information core of the embodiment of FIG. 8 as a function of the NI of the sampled portion of the transient signal coupled to the signal core.

From this relationship it is seen that the true current $I_T$ that affects the magnetic state of core 60 and that is due to the application of the strobe pulse 20 is a function of the signal current coupled to core 62. This relationship is illustrated in FIG. 9 wherein the total flux $\phi_{60}$ of core 60 is plotted as a function of the magnetomotive force $NI_{62}$ of the drive signal coupled to core 62.

Operation of the magnetic memory device of FIG. 8 is best explained by the use of FIGS. 10*a*, 10*b*, 10*c* and 11*a*, 11*b*, and 11*c*. For the illustrated embodiment of FIG. 6, bidirectional signal 30 is of a maximum amplitude less than $NI_0$ and is coupled at time $t=0$ to the signal core 62 by constant current sources 70 by way of drive line 72. Strobe pulse 20 is, as discussed above, of a time-limited amplitude-duration characteristic such as to drive the magnetic states of cores 60 and 62 from an initial saturated state $-\phi_s$ to a time-limited 50% flux state $\phi_0$—see FIG. 5. Additionally, strobe pulse 20 is of a duration $D=50$ ns. (nanoseconds) which is also chosen as a delay increment D which is the incremental delay time of delay 46 of FIG. 7 and which is the incremental delay of strobe pulse 20 with respect to transient signal 30. As illustrated in FIG. 6, pulses 74, 76, 78, 80, . . . 82 are the combined drive signals due to strobe pulse 20 and transient signal 30 for the delays of strobe pulse 20 delay times 0, 2D, 4D, 6D . . . 26D, respectively.

Preparatory to the write-in operation constant current type clear generator 84 couples clear pulse 86, which is of a saturating amplitude-duration characteristic, to drive line 88 setting the magnetic states of cores 60 and 62 in an initial clear state $-\phi_s$— see FIG. 10*a* and FIG. 11*a*, respectively. Next, if the write-in operation is initiated without a signal 30 being coincident in time with the strobe pulse 20; a strobe generator 64 couples strobe pulse 20 to cores 60 and 62 by way of drive line 66 setting the magnetic states of cores 60 and 62 into a set state $\phi_0$—see FIG. 10*a* and FIG. 11*a*, respectively. For the readout operation constant current type read generator 90 couples read pulse 92, which is of a saturating amplitude-duration characteristic, to core 60 by way of drive line 94. This readout operation causes the magnetic state of core 60 to move from the set state $\phi_0$ back into its initial state $-\phi_s$ inducing in sense line 96 an output signal 98 which is coupled to sense amplifier 100. Sense amplifier 100, in turn, may be coupled to a utilization device 102 (Readout Means) such as disclosed in the copending application of Charles W. Lundberg et al., Ser. No. 351,413, filed Mar. 12, 1964 and assigned to the same assignee as is the present invention. The utilization device 102 would be adjusted to interpret the flux change of signal 98 as indicative of a stored transient signal 30 sampled portion of zero amplitude-duration characteristic. FIGS. 10*a* and 11*a* illustrate the like effect upon cores 60 and 62 by strobe pulse 20 under this condition.

Next, assume that strobe pulse 20 is to be delayed a delay of $D=6$ with respect to the initiation of the transient signal 30. As before, the preparatory or set-up operation is initiated when constant current type clear signal generator 84 couples clear pulse 86 to drive line 88 setting the magnetic states of cores 60 and 62 in an initial clear state $-\phi_s$. Now at time $t=0$ signal generator 70 couples transient signal 30 to core 62 by way of drive line 72. As the MMF (magnetomotive force) of transient signal 30 alone is of an insufficient amplitude-duration characteristic to effect an irreversible flux change in the coupled cores, the magnetic states of cores 60 and 62 remain at their initial state of $-\phi_s$. However, at time $t=0.3$ $\mu$s. (microseconds), i.e., when strobe pulse 20 is delayed a period $D=6$ with respect to transient signal 30, the coincident in time accumulative effect of transient signal 30 and strobe pulse 20 produces pulse 80—see FIG. 6—which is coupled to signal core 62. As before, only strobe pulse 20 is coupled to core 60. However, as discussed before with respect to the generation of the back EMF due to a drive signal coupling a core causing the core to undergo a flux change therein there is generated in drive line 66 a back EMF due to the sampled portion of transient signal 30 which is that portion of transient signal 30 coincident in time with the delayed strobe pulse 20. This back EMF has the effect of reducing the MMF effectiveness of strobe pulse 20 upon cores 60 and 62. FIGS. 10*b* and 11*b* illustrate this effect upon information core 60 and signal core 62, respectively, wherein the flux state of core 60 is placed in a reduced flux state $\phi_1$ and the flux state of core 62 is placed in a flux state $\phi_3$ which is the net effect of strobe pulse 20 and the sampled portion of transient signal 30 at time $t=0.3$ $\mu$s. As before, for the readout operation read generator 90 couples read pulse 92 to core 60 setting the magnetic state of core 60 back into its initial flux state of $-\phi_s$. Accordingly, it is apparent from an inspection of FIG. 10*b* that the effect upon the magnetic state of core 60 due to the coupling of transient signal 30 to core 62 has been a change in flux of $\phi_0$ to $\phi_1$. This change in flux produces a reduced signal 98*a* in sense line 96 upon readout which signal 98*a* is coupled to sense amplifier 100 and thence to utilization device 102.

In the event that the sampled portion of transient signal 30 is of an opposite polarity to the coincident strobe pulse 20, such as at time $t=0.7$ $\mu$s. producing pulse 104 of FIG. 6, the back EMF induced in drive line 66 due to the sampled portion of transient signal 30 is of an additive effect in core 60 with strobe pulse 20 and of a subtractive effect in core 62 with strobe pulse 20. Reference to FIGS. 10*c* and 11*c* indicates that the effective magnetomotive force of pulse 20 due to the back EMF induced in line 66 due to the coincident sampled portion of signal 30 is effective to set the magnetic states of cores 60 and 62 in a magnetic state $\phi_5$. However, inspection of FIG. 11*c* indicates that the greater effect of the sampled portion of signal 30 is subtractive from that of the effective magnetomotive force of strobe pulse 20 and the additive effect of the back EMF induced in line 66 due to the sampled portion of signal 30 causes the final magnetic state of core 62 to come to rest at a magnetic state $\phi_4$. Thus, when the readout operation is initiated by the coupling of read pulse 92 to core 60 the flux change in core 60 coupling sense 96 is $\phi_5$ to $-\phi_s$ producing a larger output signal amplitude 98*b* which signal is coupled to sense amplifier 100 and thence in turn to utilization device 102.

In order to provide an output signal whose polarity and amplitude has a more direct correspondence to the polarity and amplitude of the particular sampled portion of transient signal 30 the magnetic device of FIG. 12 is presented. In the arrangement of FIG. 12 there are utilized three cores; signal core 112, information core 110 and buck-out core 114. In contrast to the sense line arrangement of FIG. 8, the arrangement of FIG. 12 utilizes a sense line 116 coupled to sense amplifier 118 whereby sense line 116 is coupled to both cores 110 and 114 in opposing magnetic sense. This arrangement of sense line 116 with information core 110 and buck-out core 114 produces a difference-signal in sense line 116 which has a polarity correspondence to the polarity of the sampled portion of transient signal 30 and has an amplitude correspondence to the amplitude of the sampled portion of transient signal 30. As in the operation of the embodiment of FIG. 8, preparatory to the write-in operation constant current type clear generator 120 couples saturating amplitude-duration clear pulse 122 to cores 110, 112 and 114 by way of drive line 124. This places the magnetic states of cores 110, 112, and 114 in an initial $-\phi_s$ state—see FIGS. 10*a* and 11*a*. Next, constant current type strobe generator 126 couples time-limited strobe pulse 128 to core 114 by way of line 130 causing the magnetic state of core 114 to be placed in a set $\phi_0$ state—see FIG. 10*a*. Next, constant current type signal generator 132 at time $t=0$ couples transient signal 30 to core 112 by way of drive line 134. As transient signal 30 is of an insufficient amplitude-duration characteristic to cause an appreciable effect upon the magnetic state of any core coupled thereto the coupling of transient signal 30 to core 112 causes no effect upon its initial flux state of $-\phi_S$.

Assuming that transient signal 30 is to be sampled at a time $t=0.3$ $\mu$s., or at a delay of $D=6$ representative of pulse 80 of FIG. 6, strobe generator 136 couples strobe pulse 20 to cores 110 and 112 by way of drive line 138. As discussed before with respect to FIG. 8, the back EMF generated in drive line 138 due to the sampled portion of transient signal 30 causes an effective reduction in the magnetomotive force of strobe pulse 20 as regards information core 110 causing the magnetic state of core 110 to be set in the magnetic state $\phi_1$—see FIG. 10*b*. Meanwhile, the back EMF generated in drive line 138 due to the sampled portion of transient signal 30 at time $t=0.3$ $\mu$s. causes the magnetic state of core 112 to be set at a magnetic state of $\phi_3$—see FIG. 11*b*. At this time the magnetic states of the three cores are: core 114, $\phi_0$; core 110, $\phi_1$; and core 112, $\phi_3$. For the readout operation constant current type read generator 140 couples saturating amplitude-duration characteristic read pulse 142 to cores 110 and 114 by way of drive line 144. With the magnetic state of core 110 set at $\phi_1$ and the magnetic state of core 114 set at $\phi_0$, and due to the winding arrangement of sense line 116 with cores 110 and 114 there is produced in sense line 116 a difference-signal due to the difference in flux state $\phi_0$-$\phi_1$. This produces a positive polarity output signal 146 in sense line 116 which is coupled to sense amplifier 118. Sense amplifier 118 couples the amplified output signal to utilization device 148, which may be similar to the utilization device 102 of FIG. 8, which interprets the polarity and amplitude of the output signal of sense amplifier 118 providing an indication of the polarity and amplitude of the sampled portion of transient signal 30 at a delay of $D=6$.

If the sampled portion of transient signal 30 is of a negative polarity as at $D=14$ at time $t=0.7$—see FIG. 6—as discussed above in regard to FIG. 8, the magnetic states of the cores after the sampling operation are: core 114, $\phi_0$; core 110, $\phi_5$; and core 112, $\phi_4$. With this arrangement of the flux states of the cores upon the readout operation, output signal 150 would be of the opposite polarity to and of a different amplitude-duration characteristic than signal 146 causing differential sense amplifier 118 to couple a corresponding output signal to utilization device 148.

In an application where nondestructive readout of the information stored in the information core is desired, a second embodiment of the present invention as disclosed in FIG. 13 may be utilized. In the embodiment of FIG. 13 signal core 160 may be similar to signal core 62 of FIG. 8 while information core 162 may be a conventional transfluxor as discussed hereinabove. Additionally, as the operation of a transfluxor, such as core 162, operates on a transfer of the flux about the small aperture and as information is stored in the transfluxor by the affecting of a change in the magnetic state of flux path 2 (see FIG. 13) between the large and small apertures, it is preferred that path 2–3 of core 162 has substantially the same total flux capacity and reluctance as that of core 160. Accordingly, when strobe pulse 20 is coupled to cores 160 and 162 the flux paths defined by core 162 and by path 2–3 around the large aperture of core 162 are placed in the same time-limited 50% flux state $\phi_0$ as in FIGS. 11*a* and 10*a*, respectively. In this respect the operation of the flux about the large aperture of core 162 functions the same as that of information core 60 of FIG. 8. It is to be understood that such limitation—the limitation that the flux paths defined by core 160 and path 2–3 around the large aperture of core 162 are to be substantially similar—is not necessary to the operation of the present invention, but is merely utilized to expedite the explanation of the operation of the embodiment of FIG. 13 with the use of FIGS. 10*a*, 10*b*, and 10*c* and FIGS. 11*a*, 11*b* and 11*c*. As in the operation of the embodiment of FIG. 8 preparatory to the write-in operation constant current type clear generator 164 couples clear pulse 166, which is of a saturating amplitude-duration characteristic, to drive line 168 setting the magnetic states of cores 160 and 162 in an initial clear state $-\phi_S$. Next, at a time $t=0$, constant current type signal generator 170 couples transient signal 30 to signal core 160 by way of drive line 172. As in the operation of the embodiment of FIG. 8 as the magnetomotive force of transient signal 30 alone is of an insufficient amplitude-duration characteristic to effect an irreversible flux change in the coupled core, the magnetic state of core 160 remains at its initial state of $-\phi_S$. Next, assuming that transient signal 30 is to be sampled at a time subsequent to its initiation such as at a time $t=0.3$ $\mu$s. or at a delay of $D=6$ with respect to the initiation of the transient signal 30, at a time $t=0.3$ $\mu$s. after the initiation of the transient signal 30 constant current type strobe generator 174 couples strobe pulse 20 to cores 160 and 162 by way of drive line 176. At such time, i.e., when strobe pulse 20 is delayed a period $D=6$ with respect to transient signal 30, the coincident in time accumulative affect of transient signal 30 and strobe pulse 20 produces pulse 80—see FIG. 6—which is coupled to signal core 160. As with the embodiment of FIG. 8 only strobe pulse 20 is coupled to information core 162. However, as discussed before with respect to the generation of the back EMF due to a drive current coupling a core causing the core to undergo a flux change therein there is generated in drive line 176 a back EMF due to the sampled portion of transient signal 30 which is that portion of transient signal 30 coincident in time with the delayed strobe pulse 20. This back EMF has the effect of reducing the effectiveness of strobe pulse 20. FIGS. 10*b* and 11*b* illustrate this effect upon information core 162 and signal core 160, respectively, wherein the flux state of information core 162 is placed in a reduced flux state $\phi_1$ and the flux state of signal core 160 is placed in a flux state $\phi_3$ which is the net effect of strobe pulse 20 and the sampled portion of transient signal 30 at time $t=0.3$ $\mu$s.

For the readout operation constant current type read-reset generator 178 couples saturating amplitude-duration characteristics—with respect to flux path 1–2 around the small aperture of core 162—read pulse 180 to the small aperture of core 162 by way of drive line 182. Read pulse 180 moves the magnetic state of path 1–2 from the previously set state $\phi_1$ of FIG. 10*b* back into its initial state $-\phi_S$ producing a flux change in path 1–2 of $\phi_1$ to $-\phi_S$ inducing a corresponding output signal 184 in sense line 186. Sense amplifier 188 amplifies output signal 184 and couples the amplified output signal to utilization device 190, which device may be similar to utilization device 102 of FIG. 8. After readout, read-reset generator 178 couples reset pulse 192, which may be of the same amplitude-duration characteristics as read pulse 180 but of the opposite polarity, to the small aperture of core 162 setting the magnetic state of path 1–2 back into its previously set state $\phi_1$. For a more detailed discussion of the operation of the transfluxor, see the hereinbefore referred to article, "The Transfluxor" by Rajchman and Lo.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims:

1. A magnetic memory device comprising:
an information core and a signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

a strobe pulse drive line serially coupling said information core and said signal core;

constant current type strobe generator means for coupling a relatively short duration time-limited strobe pulse to said strobe pulse drive line for setting the magnetization of said cores into a time-limited set state;

constant current type signal generator means for coupling a relatively long duration transient electrical signal to said signal core;

said strobe pulse coincident with a relatively short duration sampled portion of said transient signal;

said transient signal sampled portion producing a flux change in said signal core with said flux change inducing in said strobe pulse drive line a back EMF corresponding to the polarity and amplitude of the transient signal sampled portion;

said back EMF changing the effective MMF of said strobe pulse thereby effecting a corresponding change in the magnetization of said information core set state, whereby said change corresponds to the effect of the polarity and amplitude of said transient signal sampled portion upon said strobe pulse MMF;

a sense line coupled to said information core;

constant current type read generator means for coupling a saturating read pulse to said information core for setting the magnetization of said information core into one of its said substantially-saturated states thereby inducing an output signal in said sense line that is representative of the polarity and amplitude of said transient signal sampled portion.

2. A magnetic memory device comprising:

an information core and a signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

constant current type clear generator means for coupling a saturating clear pulse to said information core and said signal core for setting the magnetization of said cores into an initial substantially-saturated clear state;

a strobe pulse drive line serially coupling said information core and said signal core;

constant current type strobe generator means for coupling a relatively short duration time-limited strobe pulse to said strobe pulse drive line for setting the magnetization of said cores into a time-limited set state from said clear state;

constant current type signal generator means for coupling a relatively long duration transient electrical signal to said signal core;

said strobe pulse coincident with a relatively short duration sampled portion of said transient signal;

said transient signal sampled portion producing a flux change in said signal core with said flux change inducing in said strobe pulse drive line a back EMF corresponding to the polarity and amplitude of the transient signal sampled portion;

said back EMF changing the effective MMF of said strobe pulse thereby effecting a corresponding change in the magnetization of said information core set state, whereby said change corresponds to the effect of the polarity and amplitude of said transient signal sampled portion upon said strobe pulse MMF;

a sense line coupled to said information core;

constant current type read generator means for coupling a saturating read pulse to said information core for setting the magnetization of said information core into one of its said substantially-saturated states thereby inducing an output signal in said sense line that is representative of the polarity and amplitude of said transient signal sampled portion.

3. A magnetic memory device comprising:

an information core and a signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

constant current type clear generator means for coupling a saturating clear pulse to said information core and said signal core for setting the magnetization of said cores into an initial substantially-saturated clear state;

a strobe pulse drive line serially coupling said information core and said signal core;

constant current type strobe generator means for coupling a relatively short duration time-limited strobe pulse to said strobe pulse drive line for setting the magnetization of said cores into a time-limited set state from said clear state;

constant current type signal generator means for coupling a relatively long duration transient electrical signal to said signal core;

said strobe pulse coincident with a relatively short duration sampled portion of said transient signal;

said transient signal sampled portion producing a flux change in said signal core with said flux change inducing in said strobe pulse drive line a back EMF corresponding to the amplitude of the transient signal sampled portion;

said back EMF changing the effective MMF of said strobe pulse thereby effecting a corresponding change in the magnetization of said information core set state, whereby said change corresponds to the effect of the amplitude of said transient signal sampled portion upon said strobe pulse MMF;

a sense line coupled to said information core;

constant current type read generator means for coupling a saturating read pulse to said information core for setting the magnetization of said information core into one of its said substantially-saturated states thereby inducing an output signal in said sense line that is representative of the amplitude of said transient signal sampled portion.

4. A magnetic memory device comprising:

an information core and a signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

a strobe pulse drive line serially coupling said information core and said signal core;

constant current type strobe generator means for coupling a relatively short duration strobe pulse to said strobe pulse drive line for setting the magnetization of said cores into a time-limited set state;

constant current type signal generator means for coupling a relatively long duration transient electrical signal to said signal core;

said strobe generator means and said signal generator means coincidentally coupling said strobe pulse to said information core and said signal core and said transient signal to said signal core, respectively;

said strobe pulse coincident with a relatively short duration sampled portion of said transient signal;

said transient signal sampled portion producing a flux change in said signal core, said flux change inducing in said strobe pulse drive line a back EMF corresponding to the polarity and amplitude of the transient signal sampled portion;

said back EMF changing the effective MMF of said strobe pulse effecting a change in the magnetization of said information core's set state, whereby the change in said information core's set state corresponds to the polarity and amplitude of said transient signal sampled portion that is coupled to said signal core;

a sense line coupled to said information core;

constant current type read generator means for coupling a read pulse to said information core for setting the magnetization of said information core into a saturated state thereby inducing an output signal in said sense line that is representative of the polarity and amplitude of said transient signal sampled portion.

5. A magnetic memory device comprising:

an information core and a signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

constant current type clear generator means for coupling a clear pulse to said information core and said signal core for setting the magnetization of said cores into an initial substantially-saturated clear state;

a strobe pulse drive line serially coupling said information core and said signal core;

constant current type strobe generator means for coupling a relatively short duration strobe pulse to said strobe pulse drive line capable of setting the magnetization of said cores into a time-limited set state from said clear state;

constant current type signal generator means for coupling a relatively long duration transient electrical signal to said signal core;

said strobe generator means and said signal generator means coincidentally coupling said strobe pulse to said information core and said signal core and said transient signal to said signal core, respectively;

said strobe pulse coincident with a relatively short duration sampled portion of said transient signal;

said transient signal sampled portion producing a flux change in said signal core, said flux change inducing in said strobe pulse drive line a back EMF corresponding to the amplitude of the transient signal sampled portion;

said back EMF changing the effective MMF of said strobe pulse effecting a change in the magnetization of said information core set state, whereby the change in said information core's set state corresponds to the amplitude of said transient signal sampled portion that is coupled to said signal core;

a sense line coupled to said information core;

constant current type read generator means for coupling a read pulse to said information core for setting the magnetization of said information core into one of its saturated states thereby inducing an output signal in said sense line that is representative of the amplitude of said transient signal sampled portion.

6. A magnetic memory device comprising:

an information core and a signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

constant current type clear generator means for coupling a clear pulse to said information core and said signal core for setting the magnetization of said cores into an initial substantially-saturated clear state;

a strobe pulse drive line serially coupling said information core and said signal core;

constant current type strobe generator means for coupling a relatively short duration strobe pulse to said strobe pulse drive line capable of setting the magnetization of said cores into a time-limited set state from said clear state;

constant current type signal generator means for coupling a relatively long duration transient electrical signal to said signal core;

said strobe generator means and said signal generator means coincidentally coupling said strobe pulse to said information core and said signal core and said transient signal to said signal core, respectively;

said strobe pulse coincident with a relatively short duration sampled portion of said transient signal;

said transient signal sampled portion producing a flux change in said signal core, said flux change inducing in said strobe pulse drive line a back EMF corresponding to the polarity and amplitude of the transient signal sampled portion;

said back EMF changing the effective MMF of said strobe pulse effecting a change in the magnetization of said information core set state, whereby the change in said information core's set state corresponds to the polarity and amplitude of said transient signal sampled portion that is coupled to said signal core;

a sense line coupled to said information core;

constant current type read generator means for coupling a read pulse to said information core for setting the magnetization of said information core into one of its saturated states thereby inducing an output signal in said sense line that is representative of the polarity and amplitude of said transient signal sampled portion.

7. A magnetic memory device comprising:

a transfluxor type information core and a toroidal ferrite type signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

said information core having spaced-apart relatively large and small apertures therethrough forming first and second flux paths, respectively, thereabout;

constant current type clear generator means for coupling a saturating clear pulse to the large aperture of said information core and to said signal core for setting the magnetization of each of said cores into an initial substantially-saturated clear state;

a strobe pulse drive line serially coupling the large aperture of said information core and said signal core;

constant current type strobe generator means for coupling a relatively short duration time-limited strobe pulse to said strobe pulse drive line capable of setting the magnetization of said information core's first flux path and of said signal core into a time-limited set state from said clear state;

constant current type signal generator means for coupling a relatively long duration transient electrical signal to said signal core;

said strobe generator means and said signal generator means coincidentally coupling said strobe pulse to said information core and said signal core and said transient signal to said signal core, respectively;

said strobe pulse coincident with a relatively short duration sampled portion of said transient signal;

said transient signal sampled portion producing a corresponding flux change in said signal core with said flux change inducing in said strobe pulse drive line a back EMF corresponding to the amplitude of the transient signal sampled portion;

said back EMF changing the effective MMF of said strobe pulse effecting a change in the magnetization of said information core's first flux path's set state, whereby the change in said magnetization corresponds to the amplitude of said transient signal sampled portion that is coupled to said signal core;
a sense line coupled to said information core's small aperture;
constant current type read-reset generator means for coupling a saturating read pulse to said information core's small aperture for setting the magnetization of said information core's second flux path into one of its saturated states thereby inducing an output signal in said sense line that is representative of the polarity and amplitude of said transient signal sampled portion.

8. A magnetic memory device comprising:
a transfluxor type information core and a toroidal ferrite type signal core, each of said cores having a substantially rectangular hysteresis characteristic and being capable of being operated in a time-limited, an amplitude-limited or a saturated magnetic condition as a function of a magnetic field of a predetermined amplitude-duration characteristic;
said information core having spaced-apart relatively large and small apertures therethrough forming first and second flux paths, respectively, thereabout;
constant current type clear generator means for coupling a saturating clear pulse to the large aperture of said information core and to said signal core for setting the magnetization of each of said cores into an initial substantially-saturated clear state;
a strobe pulse drive line serially coupling the large aperture of said information core and said signal core;
constant current type strobe generator means for coupling a relatively short duration time-limited strobe pulse to said strobe pulse drive line capable of setting the magnetization of said information core's first flux path and of said signal core into a time-limited set state from said clear state;
constant current type signal generator means for coupling a relatively long duration transient electrical signal to said signal core;
said strobe generator means and said signal generator means coincidentally coupling said strobe pulse to said information core and said signal core and said transient signal to said signal core, respectively;
said strobe pulse coincident with a relatively short duration sampled portion of said transient signal;
said transient signal sampled portion producing a corresponding flux change in said signal core with said flux change inducing in said strobe pulse drive line a back EMF corresponding to the polarity and amplitude of the transient signal sampled portion;
said back EMF changing the effective MMF of said strobe pulse effecting a change in the magnetization of said information core's first flux path's set state, whereby the change in said magnetization corresponds to the polarity and amplitude of said transient signal sampled portion that is coupled to said signal core;
a sense line coupled to said information core's small aperture;
read-reset generator means for coupling a saturating read pulse to said information core's small aperture for setting the magnetization of said information core's second flux path into one of its saturated states thereby inducing an output signal in said sense line that is representative of the polarity and amplitude of said transient signal sampled portion.

References Cited

UNITED STATES PATENTS

| | | | |
|---|---|---|---|
| 2,856,596 | 10/1958 | Miller | 340—174 |
| 2,900,623 | 8/1959 | Rosenberg | 340—174 |
| 3,027,547 | 3/1962 | Froehlich | 340—174 |
| 3,032,749 | 5/1962 | Newhouse | 340—174 |
| 3,125,743 | 3/1964 | Pohm et al. | 340—174 |
| 3,196,413 | 7/1965 | Teig | 340—174 |
| 3,274,570 | 9/1966 | Brekne | 340—174 |
| 3,276,001 | 9/1966 | Crafts | 340—174 |
| 3,278,916 | 10/1966 | Kiseda et al. | 340—174 |
| 3,311,899 | 3/1967 | Olsson et al. | 340—174 |
| 3,341,830 | 9/1967 | Conrath | 340—174 |

STANLEY M. URYNOWICZ, Jr., *Primary Examiner.*